(12) United States Patent
Bugar

(10) Patent No.: US 8,561,785 B2
(45) Date of Patent: Oct. 22, 2013

(54) SYSTEM AND METHOD FOR DETECTING THE ROTATION OF AN IDLER WHEEL THROUGH A NON-ROTATING SHAFT

(75) Inventor: Ronald J. Bugar, Chicago, IL (US)

(73) Assignee: United Conveyor Corporation, Waukegan, IL (US)

( * ) Notice: Subject to any disclaimer, the term of this patent is extended or adjusted under 35 U.S.C. 154(b) by 71 days.

(21) Appl. No.: 13/357,193

(22) Filed: Jan. 24, 2012

(65) Prior Publication Data

US 2013/0186732 A1   Jul. 25, 2013

(51) Int. Cl.
*B65G 43/00* (2006.01)
(52) U.S. Cl.
USPC .................... 198/502.4; 198/810.01; 198/323
(58) Field of Classification Search
USPC .............. 198/323, 502.1, 502.4, 577, 810.01, 198/810.03
See application file for complete search history.

(56) References Cited

U.S. PATENT DOCUMENTS

| | | | |
|---|---|---|---|
| 5,337,885 A * | 8/1994 | Mills et al. .................. | 198/502.4 |
| 5,954,186 A | 9/1999 | Stroobandt | |
| 6,758,327 B1 * | 7/2004 | Stebnicki et al. ............. | 198/832 |
| 7,195,115 B2 * | 3/2007 | DePaso ......................... | 198/834 |
| 7,347,317 B2 * | 3/2008 | Aizawa et al. ............. | 198/810.02 |
| 7,530,449 B2 * | 5/2009 | Nakashima et al. ..... | 198/810.03 |

* cited by examiner

*Primary Examiner* — Leslie A Nicholson, III
(74) *Attorney, Agent, or Firm* — Niro, Haller & Niro

(57) ABSTRACT

The system and method comprising at least one idler wheel for use with a drag chain mechanism. The device for use with the idler wheel has a rotatable shaft for receiving the rotational force of the idler wheel, and transmits that force to a rotation indicator which is external to the enclosed space where the idler wheel is located. The rotation indicator thus provides a reliable method for indicating to an external sensor or operator whether an idler wheel is rotating within acceptable operational parameters.

16 Claims, 2 Drawing Sheets

SYSTEM AND METHOD FOR DETECTING THE ROTATION OF AN IDLER WHEEL THROUGH A NON-ROTATING SHAFT

FIELD OF INVENTION

The present invention relates to a system and method for detecting and measuring rotation of an idler wheel where the idler wheel is not directly observable and is further supported by a non rotating shaft. Specifically, the present invention includes a rotating shaft coupled to an idler wheel and disposed to have one end extending axially outward from an opening defined by the non-rotating shaft, with an indicator plate coupled to the end of the rotating shaft opposite the idler wheel. The indicator plate then displays the rotation motion transferred through the rotating shaft (either through a visual display or via measurement by a sensor) such that the operator may determine whether the idler wheel is rotating at an acceptable rate. The present invention has particular applicability in the field of conveyor systems, specifically for applications in which ash or other particulate is transported or remove from an environment which is enclosed and/or corrosive.

BACKGROUND OF THE INVENTION

There are a variety of industrial applications which require the transport and/or processing of large volumes of material containing solids particulate. For instance, many coal burning facilities require the transport of large volumes of ash and related byproducts as part of the normal process of operation. In order to remove, process and/or transport such materials, it is common to use a conveyor system employing a chain, a belt or the like. A common component in systems for guiding and supporting such chains or belts (e.g., to facilitate a change in direction) is a component known as an idler wheel. Such wheels are often supported by a fixed, non-rotating shaft, and often are not directly driven by a motor or the like, though they need to maintain a specified rate of rotation to keep the belt or chain from breaking during operation. Thus, there is a need to know if the idler wheel is rotating to prevent damage or failure of the conveyor chain or belt.

Unfortunately, the operating conditions that are required of certain conveyance systems, such as the presence of fluids and/or corrosives which render direct observation of idler wheels impractical. Furthermore, the scale and operating location of certain conveyance systems may make localized observation impractical.

Presently available conveyor system technology includes the use of a rotation sensor embedded in the non-rotating shaft supporting the idler wheel. Such sensors can be used, for instance, to detect the rotation of a magnetic target plate mounted to the inside of the end cap that is bolted rigidly to the idler wheel. However, the use of such in situ sensor designs is that the sensor itself may be susceptible to a high rate of failure. Specifically, such sensors include the use of conductor wires extending from the non-rotating shaft during installation. In addition, the in situ sensor itself, as well as the sensor conductor wire, are particularly prone to failure in adverse operating conditions, such as high temperatures and/or corrosive environments.

Thus, the present state of the art reflects a need for a system which reliably detects and monitors the rotation of an idler wheel for a variety of conveyance systems and in various operating environments without requiring the use of in situ sensors and or other complex components with increased cost and failure risks.

DESCRIPTION OF THE PRIOR ART

One example of a prior art approach is found in U.S. Pat. No. 5,954,186 (Stroobandt). This approach is an example of the conveyor technology which uses an encoder or proximity sensor which works with a target attached to the end cap such that when the idler wheel rotates, the proximity sensor sends a signal through the end of the wire (which extends through an opening in the stationary shaft) to a programmable logic control or speed control monitor or a zero speed switch. Such an approach, however, necessarily requires a sensor within the enclosed space of the non-rotating shaft, and thus is exposed to the operating conditions found in a variety of conveyor applications, including high temperature and/or corrosive or abrasive conditions. Thus, such an in situ approach is susceptible to failure at high temperatures and/or corrosive conditions. In addition, the sensor conductor wire in such an approach needs to extend out of the non-rotating shaft. Such wires are typically susceptible to failure during installation. In addition to temperature and operating condition failures during operation.

What is needed is simple, cost effective solution for the observation and monitoring of rotation in an idler wheel for a variety of conveyance systems which can be used in adverse operating conditions.

DEFINITION OF TERMS

The following terms are used in the claims of the patent as filed and are intended to have their broadest plain and ordinary meaning consistent with the requirements of the law.

A "Rotation indicator" means a representation of rotation of an idler wheel which is provided for observation outside of the enclosed space in which the idler wheel operates. Examples of such a rotation indicator would include a disc with demarcations (such as alternating colors) which could be observed directly by a conveyor system operator, or it could also include a disc or other movable element which could be observed and/or recorded by a sensor external to the enclosed space which could be translated for alternative display types and/or processed for use within a control system as desired.

A "Rotating shaft" refers to a component for transferring rotational movement from the idler wheel to the rotation indicator such that the value provided by the rotation indicator is related to the rotation rate of the idler wheel. The rotating shaft may be—but does not have to be coaxial with the non-rotating support shaft, and the rotating shaft may be either indirectly coupled or directly coupled (e.g., integrally formed) with the rotation indicator and/or the idler wheel.

An "idler wheel" refers to a wheel for guiding or altering the path of a continuous conveyor in a drag chain system.

A "drag chain system" refers to a system which uses cables, chains or a similar continuous conveyance system for the conveyance of materials past or around a series of wheels, including at least one idler wheel.

Where alternative meanings are possible, the broadest meaning is intended. All words used in the claims set forth below are intended to be used in the normal, customary usage of grammar and the English language.

OBJECTS AND SUMMARY OF THE INVENTION

The apparatus and method of the present invention generally includes a rotating shaft connected to the idler wheel of a conveyor system. The idler wheel is typically supported by a non-rotating shaft, which is connected to a frame, container, or similar structure which defines an enclosed space for the idler wheel. The rotating shaft is preferably disposed within the non-rotating shaft and extends out of the enclosed space, where it is connected to a rotation indicator. The rotating shaft is coupled to the idler wheel, either through connection to a piece such as an end cap, or integral casting or molding as needed. In addition, the rotation indicator may be similarly connected to or integrally formed with the rotating shaft. As a result of such couplings, the rotation indicator will provide a rotational movement related to the rate of rotation of the idler wheel. This rotation indicator can either have a visual indicator which permits an operator to observe and determine whether the rate of rotation is acceptable, or in the alternative, the rotation can be measured and processed by a sensor which is external to the enclosed space. The sensor readings can be used to provide a display to an operator, and/or to provide an input to a process control unit to determine whether or not the rate of rotation of the idler wheel is acceptable.

The immediate application of a present invention will be seen in processing such as processing ash and similar particulate from operating plants, though those of skill will see that the present invention could be applied to other fields requiring a simple and robust solution for monitoring the rate of rotation of an idler wheel, especially in applications where the idler wheel may be within an enclosed space, as well as facing potential operating conditions including high temperatures and/or corrosive conditions.

Thus can be seen that one object of the present invention is to provide a cost effective system for monitoring the rate of rotation of an idler wheel and conveyor systems.

A further object of the present invention is to provide a system and method for monitoring the rate of rotation of an idler wheel in an enclosed space while eliminating the need for a sensor or sensor equipment within the enclosed space.

Still another object of the present invention is to provide for the monitoring for the rate of rotation of an idler wheel in high temperature and/or corrosive operating conditions.

Yet another object of the present invention is to provide for a system which displays a rotational value to an operator without the need for sensors.

Still another object of the present invention is to provide a robust rotational indicator which can provide a value for input into a processing unit to determine whether the idler wheel is rotating within acceptable parameters.

It should be noted that not every embodiment of the claimed invention will accomplish each of the objects of the invention set forth above. In addition, further objects of the invention will become apparent based the summary of the invention, the detailed description of preferred embodiments, and as illustrated in the accompanying drawings. Such objects, features, and advantages of the present invention will become more apparent in light of the following detailed description of a best mode embodiment thereof, and as illustrated in the accompanying drawings.

DETAILED DESCRIPTION OF THE INVENTION

Set forth below is a description of what is currently believed to be the preferred embodiment or best examples of the invention claimed. Future and present alternatives and modifications to this preferred embodiment are contemplated. Any alternatives or modifications which make insubstantial changes in function, in purpose, in structure or in result are intended to be covered by the claims in this patent.

Figure 1:
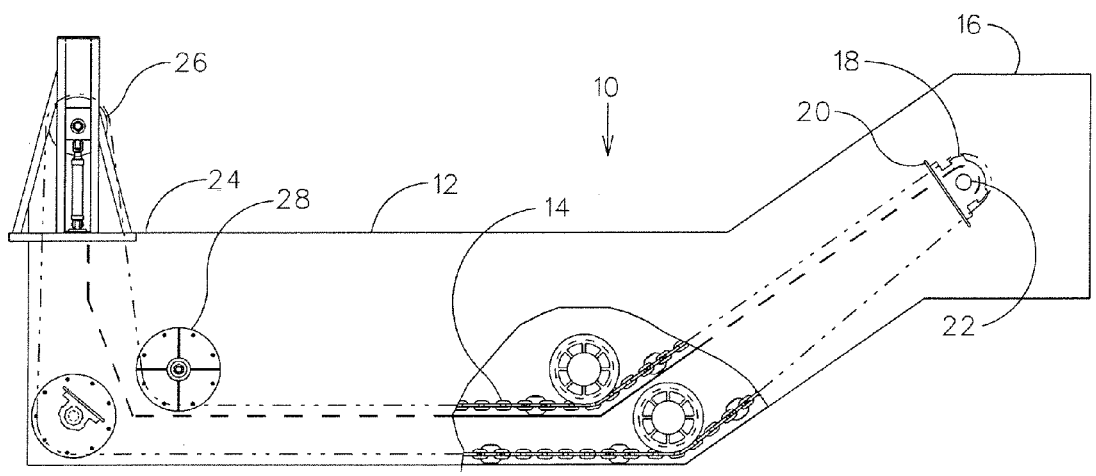
FIG. 1 shows an exposed side view of an example drag chain system with idler wheel assemblies practicing an embodiment of the rotation indicator of the present invention.

FIG. 1 shows a drag chain system constructed in accordance with the present invention. A frame 12, which can alternatively be any of a variety of enclosed spaces, such as a container, trough, transition hopper, or the like, through which a drag chain 14 (or alternative, similar conveyors such as cables, belts or the like) extends. At a first end 16 of the frame 12, pulley 18 is attached to the frame 12 through a pulley support 20, and the pulley rotates around a drive shaft 22, which is operatively connected to a motor or similar drive mechanism (not shown) which causes the entire system to operate when desired. The system 10 extends the drag chain 14 from a first end 16 at the pulley 18, to a second end 24, which in one preferred embodiment may be a chain tensioner 26. The chain tensioner 26 is operated with a hydraulic cylinder or the like (not shown), and may also be a spring adjustment whereby the tension in the chain 14 may be increased or decreased to operate within predetermined acceptable limits. One example of the general types of systems to which the present invention is directed are submerged flight conveyors (SFCs) of the type sold by the assignees of the present invention. One example of the components of such an SFC system is disclosed presently at http//unitedconveyor.com/uploadedFiles/Systems/(M0999-116)%20MAX%20Type%20SFC.pdf, and the teaching of that disclosure are incorporated herein by reference.

This example of the present invention includes one or more idler wheel assemblies 28. The function of the idler wheel assembly 28 is to support and guide the chain 14 where it is desired to change direction. In an SFC example of the present invention, the idler wheel assembly 28 has an idler wheel 30 made from cast or fabricated metal, and the rims 31 or portions of the idler wheels which are operatively connected to the chain 14 are hardened to minimize wear.

Figure 2:
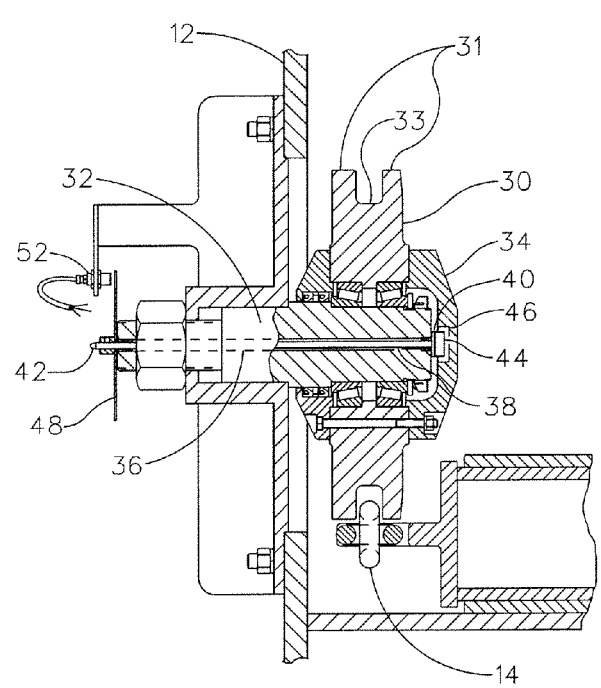
FIG. 2 is an exposed side view of another embodiment of the present invention showing a rotational indicator coupled to an idler wheel in a drag chain system.

A further detailed aspect of the idler wheel assembly 28 is shown in FIG. 2. In this preferred embodiment, the idler wheel 30 includes two rims 31 which defines a groove 33 for receiving the drag chain 14. The idler wheel 30 in this embodiment wraps around the circumference of a non-rotating shaft 32 which, in turn, is connected to and supported by the frame 12. The idler wheel system includes an end cap 34 or hub portion of the idler wheel which covers the opening in the center of the idler wheel through which the non-rotating shaft 32 extends. In a most preferred embodiment, the non-rotating shaft defines an annular opening 36 which receives a rotatable shaft 38 therethrough. A first end 40 of the rotatable shaft can connect to the end cap through a frictional or mechanical engagement such as a narrow head 44 on the rotatable shaft and which engages a reciprocal slot 46 on the end cap 34, or could even be integrally molded with the end cap as necessary. As a result of being connected with the end cap 34, the rotatable shaft receives the rotational force of the idler wheel 30 and moves accordingly. The second end 42 of the rotatable shaft 38 extends through the annular opening 36 outside of the frame 12 and in turn is connected at its second end to a rotational indicator plate 48.

Figure 3:
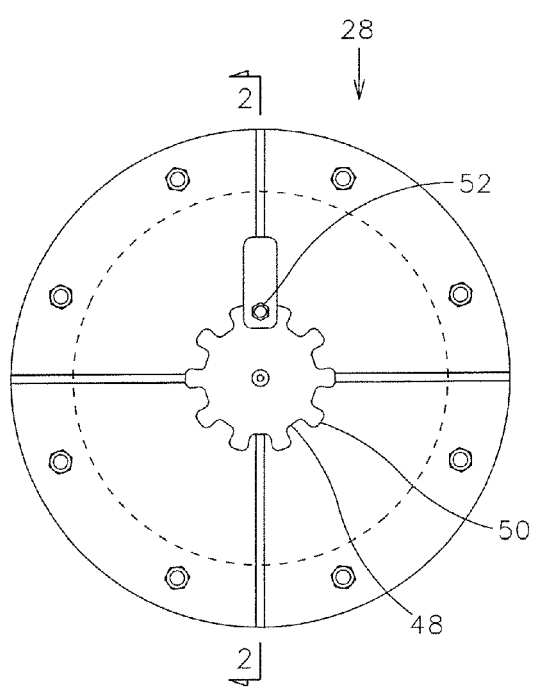
FIG. 3 is a detailed frontal view of an idler wheel assembly showing the rotational indicator practicing the present invention.

As shown in FIG. 3, one preferred embodiment of the rotational indicator plate 48 shows a generally circular configuration with a series of notches 50. Thus, as the idler wheel 30 rotates, the force is transferred to the rotational indicator plate 48, and the rate of rotation is thus visible to an operator by observing the pace at which a notch rotates around the rotational indicator plate 48. In an alternative preferred embodiment, rate of rotation of the rotational indicator plate 48 may be measured by a sensor 52 or counter or the like which can measure the rate of rotation of rotational indicator plate 48. Unlike prior art sensor configurations, however, this sensor would be outside of any frame or similar enclosed space, and further would not require leads or other wires extending inside the frame. In yet another preferred embodiment, any reading from the rotational indicator plate 48 could be transmitted by the sensor 52 to remote plant operational software (not shown), the types of which are known to those of ordinary skill. In such an embodiment, the sensor value corresponding to the rotational indicator plate 48 could simply be provided to a remote plant operator or engineer, or alternatively, could be compared against predefined acceptable rates or rotation so as to provide a warning to a plant operator if the idler wheel began rotating at a rate deemed too fast or too slow for the drag chain system 10.

The above description is not intended to limit the meaning of the words used in the following claims that define the invention. Rather, it is contemplated that future modifications in structure, function or result will exist that are not substantial changes and that all such insubstantial changes in what is claimed are intended to be covered by the claims. For instance, the rotatable shaft of the preferred embodiment of present invention is for illustrative purposes with reference to the example drawings only. Likewise, it will be appreciated by those skilled in the art that various changes, additions, omissions, and modifications can be made to the illustrated embodiments without departing from the spirit of the present invention. All such modifications and changes are intended to be covered by the following claims.

What is claimed:

1. A tool for determining the rotation of an idler wheel of a drag chain system in an enclosed space, said tool comprising:
    a) a coupling for mechanically engaging said idler wheel;
    b) a rotating shaft located within a non-rotating shaft, the rotating shaft having a first end connected to said coupling and a second end extending axially out of said enclosed space; and
    c) a rotation indicator connected to said second end of said shaft for providing a value corresponding to the rotation of said enclosed idler wheel.

2. The tool of claim 1, wherein said coupling frictionally engages said idler wheel.

3. The tool of claim 1 further comprising a sensor operatively connected to said rotation indicator for measuring said value corresponding to the rotation of said enclosed idler wheel.

4. The tool of claim 3, wherein said sensor generates a signal which can be used by a control system to determine whether the rotation of said enclosed idler wheel falls within acceptable operational limits.

5. A drag chain system comprising:
    a) an enclosed space for containing and transporting material;
    b) a conveyor extending through said enclosed space for transporting material from said enclosed space;
    c) an idler wheel in said enclosed space, said idler wheel operatively connected to said conveyor for guiding said chain;
    d) a non-rotating shaft for supporting the idler wheel, said non-rotating shaft having a first end defining an opening in said enclosed space, and a second end supporting said idler wheel;
    e) a rotating shaft disposed within said non-rotating shaft, said rotating shaft have a first end coupled to said idler wheel, and a second end extending axially out of said enclosed space through said first end of said non-rotating shaft; and
    f) a rotation indicator connected to the second end of said rotating shaft for providing a value corresponding to the rotation of said idler wheel.

6. The system of claim 5, wherein said rotating shaft is concentrically displaced within said non-rotating shaft.

7. The system of claim 5 further comprising a coupling for connecting the first end of the rotating shaft to the idler wheel, the coupling comprising a head located on the first end of the rotating shaft and an end cap for mating with said head, said end cap located on said idler wheel.

8. The system of claim 5 further comprising a sensor operatively connected to the rotation indictor for measuring said value corresponding to the rotation of said idler wheel.

9. The system of claim 8 wherein said sensor is capable of interfacing with an operator control unit to determine whether the rotation of said idler wheel falls within acceptable operational limits.

10. A method for determining the rotation of an idler wheel of a conveyor system in an adverse operating environment comprising temperature conditions which preclude reliable operation of an electronic rotational sensor, said method comprising the steps of:
    a) transferring the rotational force of an idler wheel to a rotating shaft;
    b) transmitting the rotational force from said rotating shaft to a rotational indicator; and
    c) translating said force on said rotational indicator into a visual representation corresponding to a rotational value of said idler wheel.

11. The method of claim 10, wherein the adverse operating environment comprises an enclosed space which obstructs the direct observation of said idler wheel.

12. The method of claim 10, wherein the adverse operating environment comprises electromagnetic interference.

13. The method of claim 10, wherein the adverse operating environment comprises material interference for said conveyor system.

14. The method of claim 10, wherein said visual representation comprises a color on the indicator wheel.

15. The method of claim 10, wherein said visual representation comprises an electronic sensor operatively coupled to said rotational indicator for providing a numerical value corresponding to said rotational value of said idler wheel.

16. The method of claim 10, wherein said visual representation comprises an electronic sensor operatively coupled to said rotational indicator for providing a value corresponding to the presence of rotational values outside of acceptable operating limits.

* * * * *